United States Patent [19]

Hoegger

[11] Patent Number: 5,230,421
[45] Date of Patent: Jul. 27, 1993

[54] MEANS FOR STORING AND CONVEYING OBJECTS, INSTALLATION ARRANGEMENT FOR THE MEANS AND METHOD FOR OPERATION IN A CLOSED CONTAINER

[76] Inventor: Cornel Hoegger, Flawil, Switzerland

[21] Appl. No.: 885,172

[22] Filed: May 19, 1992

[30] Foreign Application Priority Data

May 24, 1991 [CH] Switzerland .......................... 1540/91

[51] Int. Cl.⁵ .............................................. B65G 17/18
[52] U.S. Cl. ................... 198/798; 99/443 C; 99/477; 414/157; 414/196
[58] Field of Search .............................. 198/799–800; 414/157, 196; 211/121; 312/134, 268; 99/443 C, 477

[56] References Cited

U.S. PATENT DOCUMENTS 1,531,847  3/1925  Danforth et al. ................... 198/798
1,922,783  8/1933  Schmidt ............................ 99/443 C
3,243,032  3/1966  Chambon ......................... 198/799

Primary Examiner—Joseph E. Valenza
Attorney, Agent, or Firm—W. Thad Adams, III

[57] ABSTRACT

The storage arrangement for operation in an autoclave with horizontal cylinder (60) includes a conveyor chain (10), which is moved on both sides back and forth over guide sprocket wheels. Shelves (1) are conveyed with the conveyor chain (10). The parallel guidance of these shelves (1) is effected by means of parallel guide wheels (16), which run synchronously with the guide sprocket wheels (12). The guide sprocket wheels (12) are connected with idler gears (15), so that, as a whole, they present a rigid drive structure. With this kind of storage arrangement, a cylindrical autoclave can be densely packed, and it is easy to carry out heating by means of steam and cooling through spraying.

4 Claims, 9 Drawing Sheets

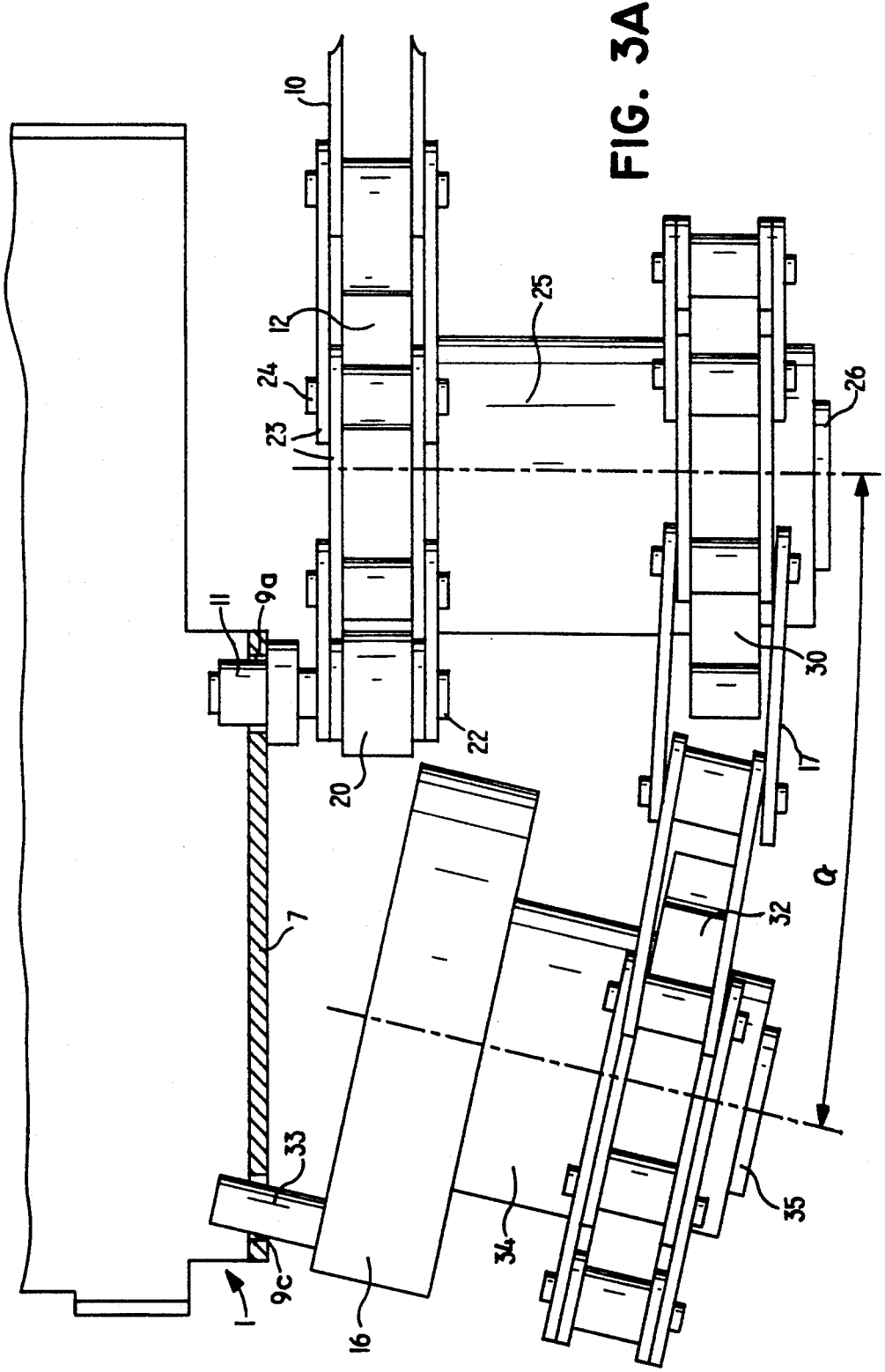

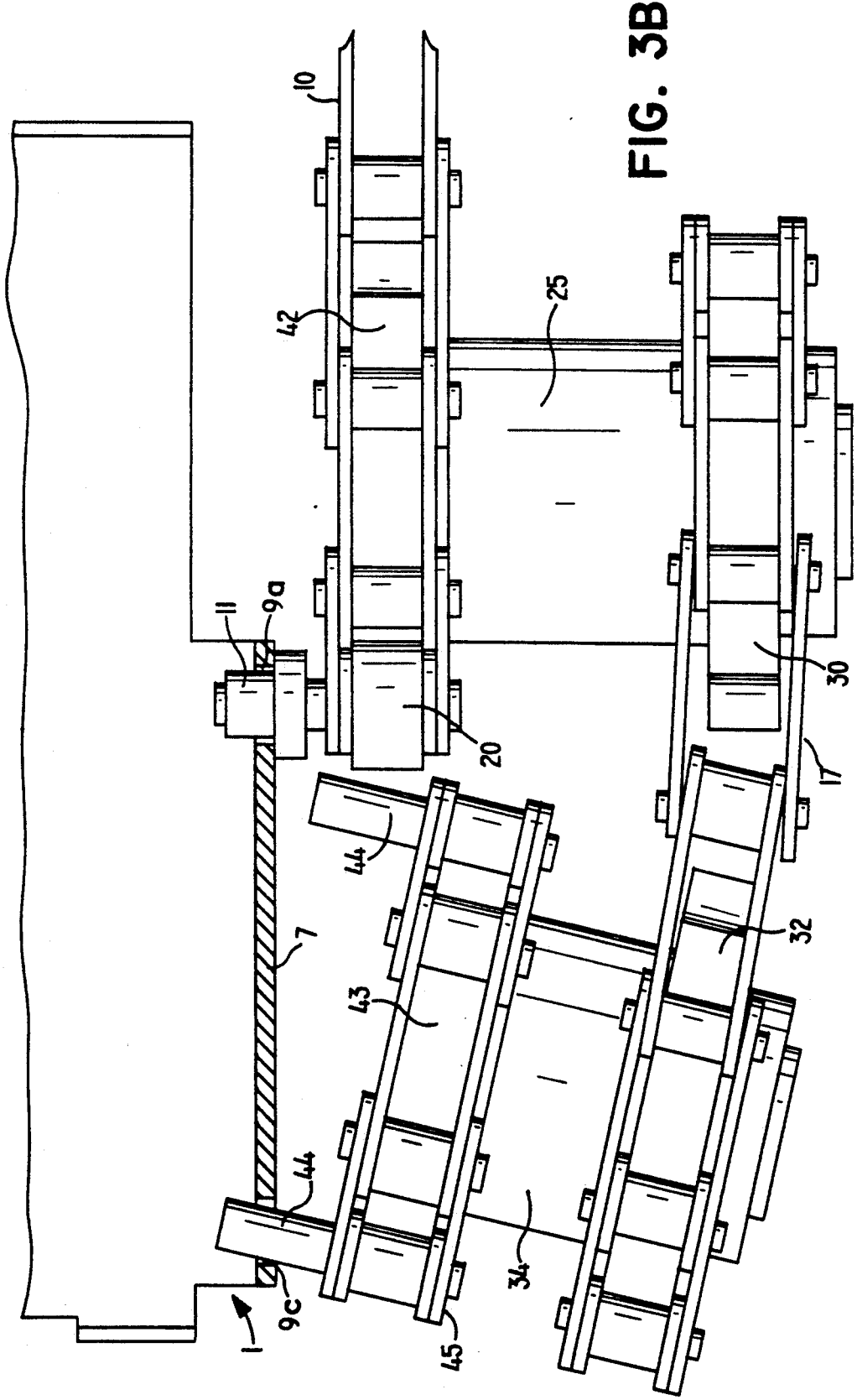

MEANS FOR STORING AND CONVEYING OBJECTS, INSTALLATION ARRANGEMENT FOR THE MEANS AND METHOD FOR OPERATION IN A CLOSED CONTAINER

The present invention relates to a means for storing and conveying objects using a continuous conveyor chain. The supporting means are designed as shelves, baskets or open pans fastened at both sides on the conveyor chain. The method according to this application includes the step of moving the conveyor chain during loading and unloading, and steadily in both the heating process and the succeeding cooling.

Autoclaves and means for charging thereof are known. For example, disclosure was made of the tower autoclave CPS 2000 of the firm of Lagarde in Moutelimar, France; it includes a conveyor with a continuous steel belt, which moves in a spiral in a tower. The advantage indicated is that less space is needed. It is obvious, however, that there is unusable hollow space in the center of the tower, so that a great deal of space can be considered as lost.

A. Paul Gronemeyer of Hoexter, Germany also disclosed a so-called "Heliflex" storage system that is equipped with two towers, the objects to be cooled being conveyed in two spiral systems. Here too, the objects are conveyed only at the periphery of the towers and some space remains empty in each.

There is a need now to create a storage unit for objects in which there is no unused hollow space; this is the object of the present invention.

According to the invention, this is achieved with a means for storing and conveying objects using a continuous conveyor chain. The supporting means are designed as shelves, baskets or open pans fastened at both sides on the conveyor chain.

With this means, an autoclave can be charged in a way that all the hollow space in a horizontal hollow cylinder other than the convex outer sides can be used for storage, so that a high storage density can be achieved with the features of a means for storing and conveying objects in an elongate housing. The features are characterized in that the housing has a hinged cover at one end and a ventilator at the other end. An unloading and loading apparatus is present in front of the side with the hinged cover.

An autoclave constructed in this way can be operated with a method characterized in that the conveyor chain is moved in steps during loading and unloading.

The invention is explained below using an example embodiment and the drawing.

FIG. 3a is a larger-scale plan view of the arrangement for parallel conveyance of a supporting means from one layer to the next according to arrow IIIa in FIG. 2.

FIG. 3b is a larger-scale plan view of the arrangement for parallel conveyance of a supporting means on the return path according to arrow IIIb in FIG. 2.

Figure 1:
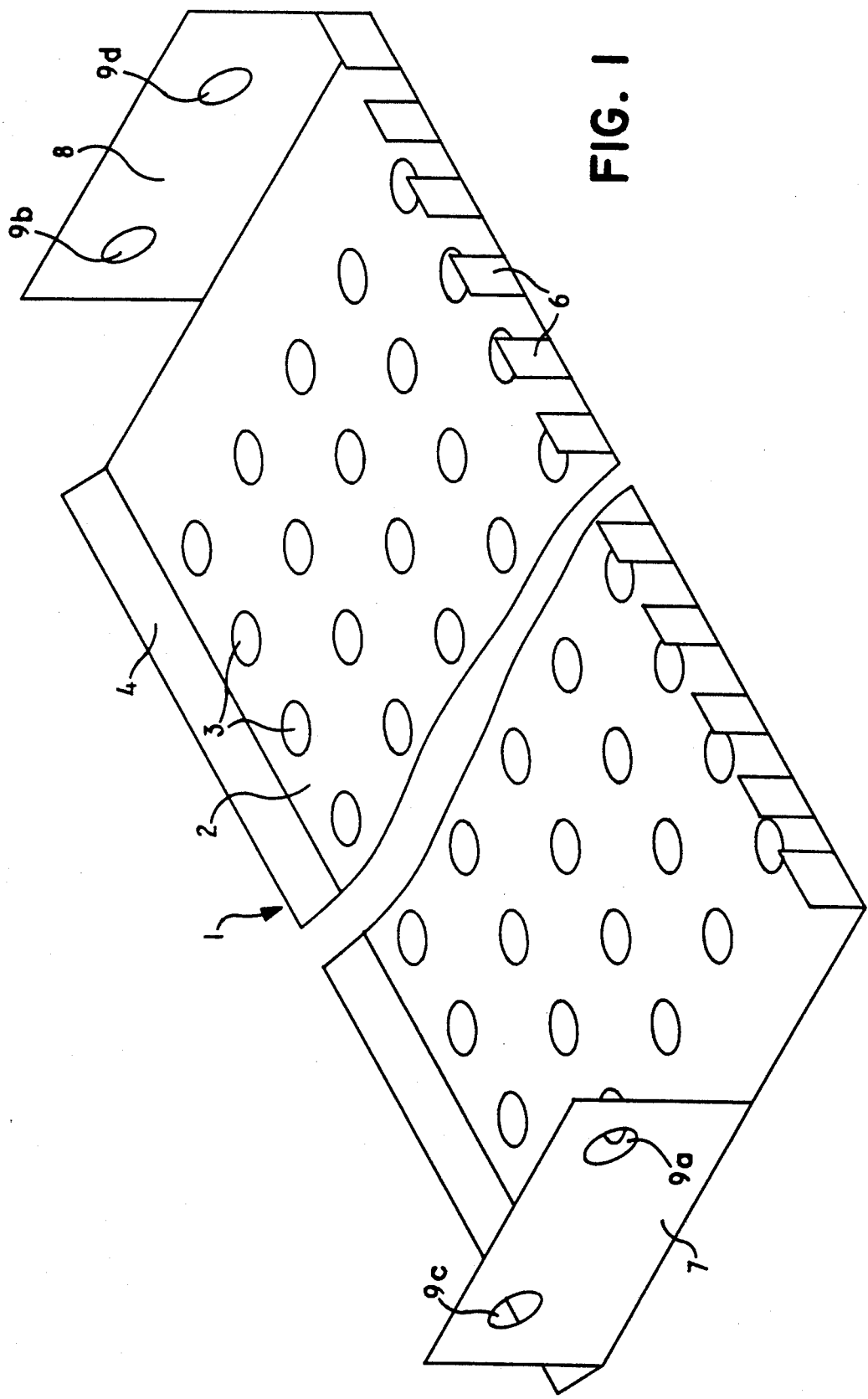
FIG. 1 is a perspective view of a supporting means.

The conveyance means is depicted as a shelf * 1 in this embodiment. This shelf has a supporting surface 2 with a large number of holes 3 for the passage of the steam for heating and of the cold water for cooling. The supporting surface 2 is provided on both longitudinal sides with retaining means, which are wall strips 4 at an obtuse angle and individual vertical tabs 6. The narrow sides of the supporting means have two conveyance tabs 7, 8 in an off-set arrangement, which extend vertically upward from the supporting surface 2. These conveyance tabs 7, 8 each have two pin openings $9a$, $9b$, $9c$ $9c$, such that two pin openings $9a$, $9b$ are in opposing arrangement at about the middle of the supporting surface and there are two further pin openings $9c$, $9d$ close to the end section in each case. That is, the pin opening $9c$ in the conveyance tab 7 is located close to the wall strip 4, and the pin opening $9d$ is close to the set up tabs 6.

Figure 4:
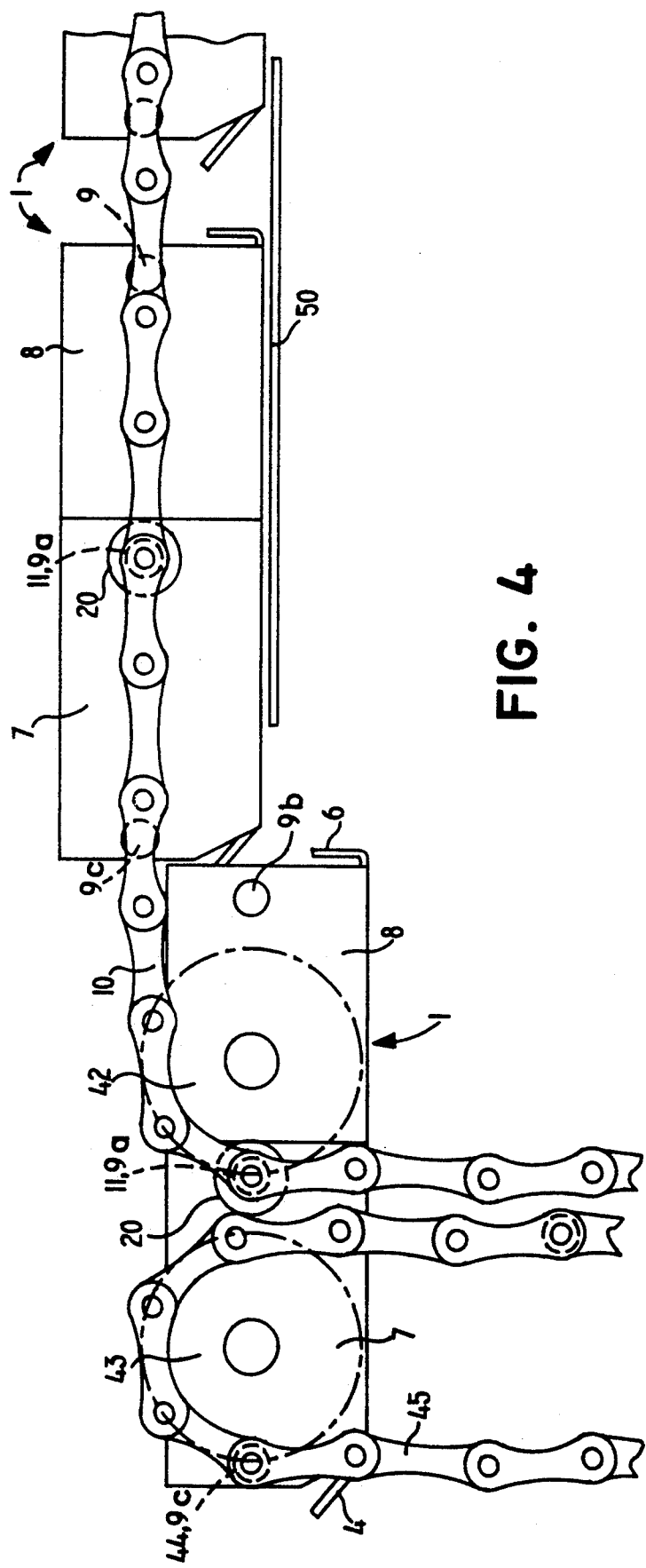
FIG. 4 is a view of the vertical conveyance path with the transition to the top layer.

For conveyance of these shelves 1, conveyor chains 10 on both sides engage the centrally arranged pin openings $9a$, $9b$ with pins 11. On the horizontal translation sections t1... t16, the shelves 1 lie to the side on rails 50 (FIGS. 4 and 5).

Figure 2:
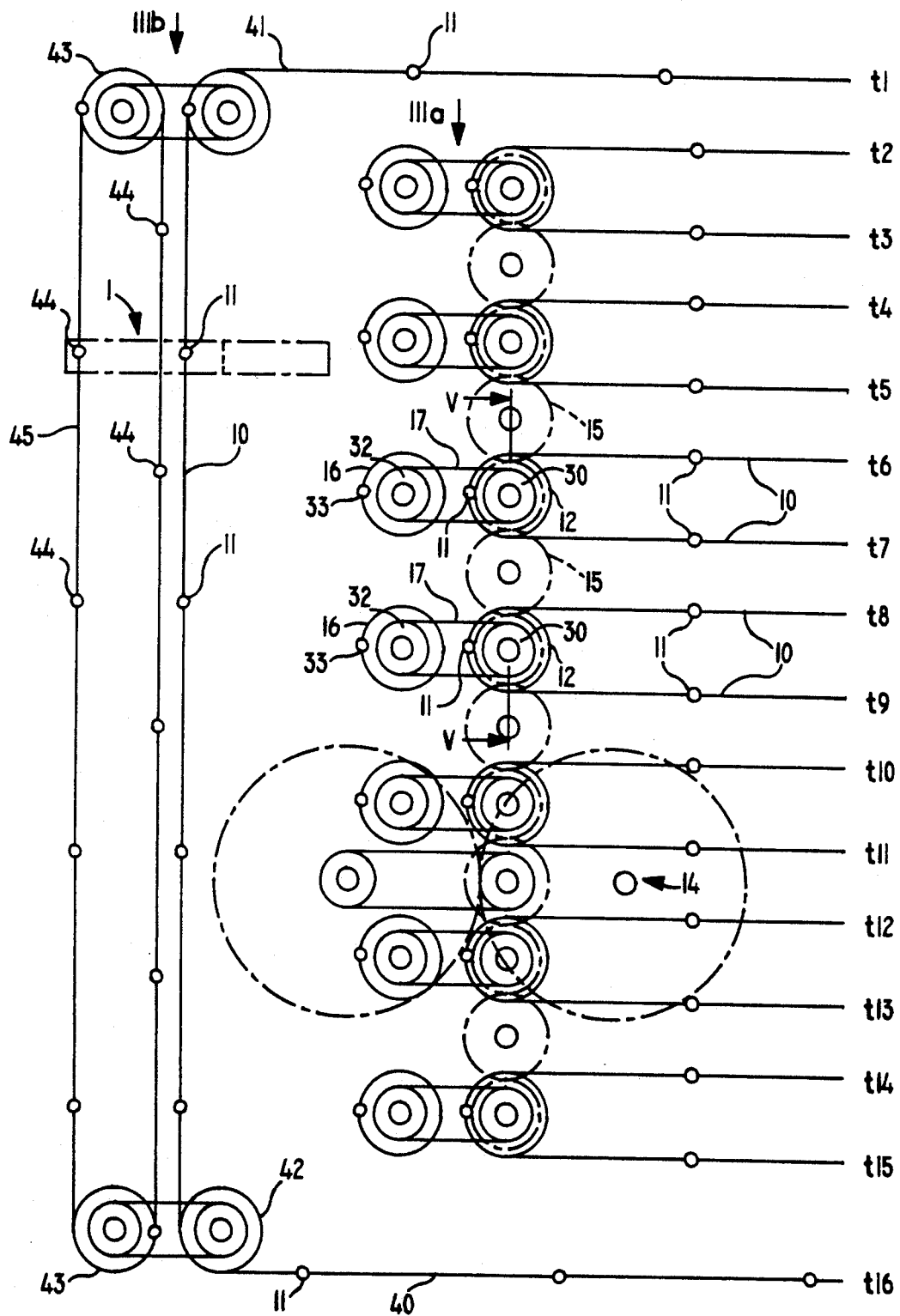
FIG. 2 is a schematic representation of the deflection points from one layer to the next and of the vertical conveyance from the bottom to the top layer.

The conveyor chain 10 is continuous and guided on both sides over guide sprocket wheels 12 (FIG. 2). The conveyor chain 10 is driven by a motor 13 and a gear 14. Transmission gears 15 are arranged between the individual guide sprocket wheels 12, so that the conveyor chain 10 is driven for each pair of horizontal runs, and the tension on the conveyor chain 10 for motion is thus reduced.

As FIGS. 2 and 3a show, each guide sprocket wheel 12 has an associated parallel guide wheel 16. Each parallel guide wheel 16 is driven by the associated guide sprocket wheel over a swivel axis 17.

Figure 5:
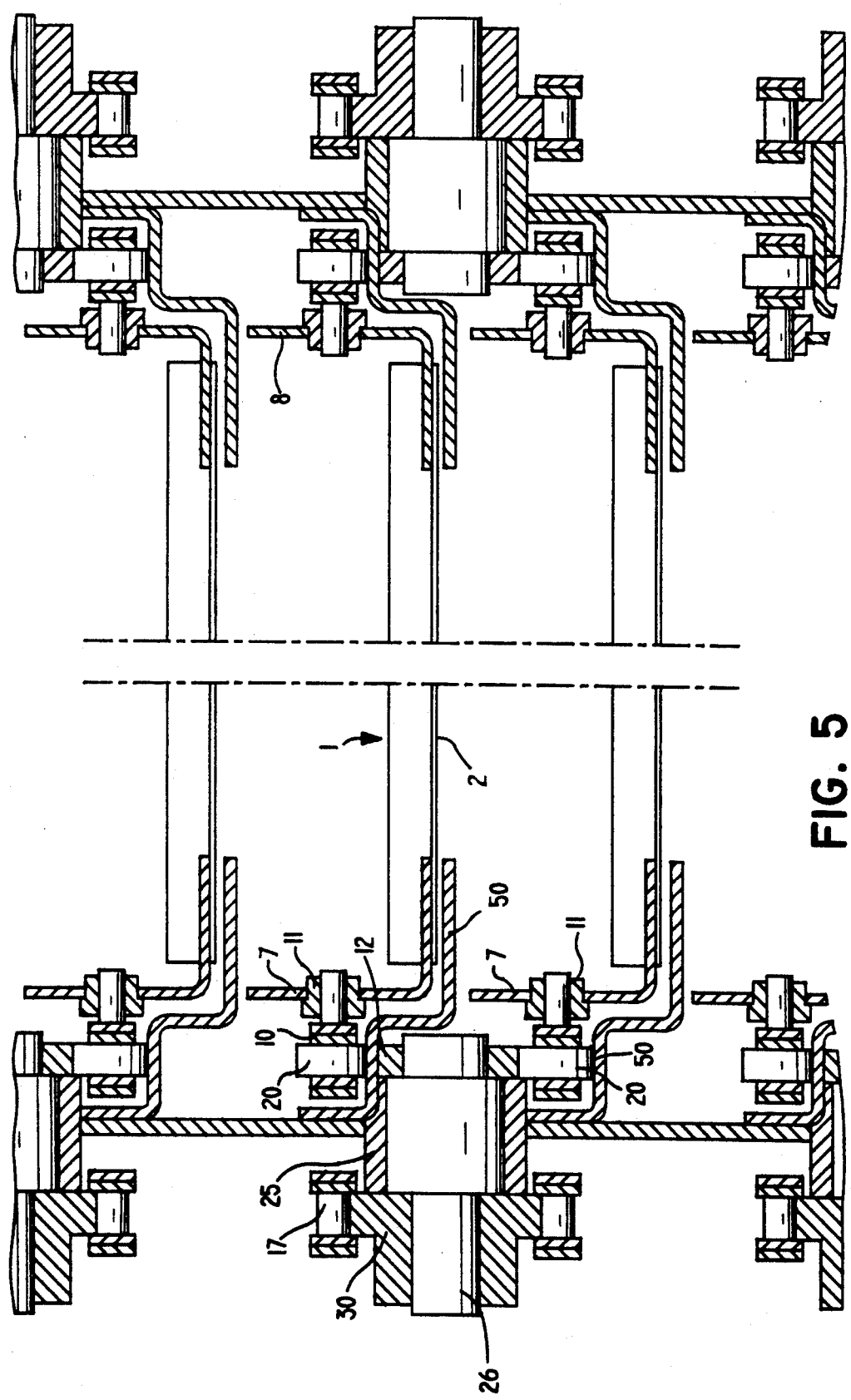
FIG. 5 is a segment of a sectional view according to the line of intersection V—V in FIG. 2.

FIGS. 3a, 3b and 5 show such deflection points in a larger scale. As described above, the shelf 1 is moved by the conveyor chain 10 by means of the conveyor pin 11 that engages a pin opening $9a$. As can be clearly seen, the chain stud is designed as a roller 20, and the guide sprocket wheel 12 is accordingly designed with tooth gaps, which can be engaged by these rollers 21 without play. This insures that drive is without play. The spindle 22 of the roller 20 is the usual chain stud 24 and supports the chain side bars 23 on both sides. The spindle 21 is extended and supports the pin 11. The guide sprocket wheel 12 is fastened to a hub 25 that is mounted to rotate on a spindle 26. This hub 25 supports a further auxiliary sprocket 30 for securing the parallel guide. By means of a swivel chain 17, the rotation of the guide sprocket wheel 12 is transferred to a parallel guide gear wheel 32, which thus has the same diameter and the same number of teeth as the auxiliary sprocket 30. The hub 34 of the auxiliary sprocket 30 thus rotates synchronously with the guide sprocket wheel 12, and this causes synchronous rotation of the parallel guide wheel 16, the direction A of the axis of rotation turned at an angle alpha = 14 degrees with respect to the direction B of the axis of the guide sprocket wheel.

As can be seen in FIGS. 3a and 3b, this oblique position serves so that the parallel guide pin 33 can engage the pin opening 9c and come out of it again on a 180 degree path without affecting the uniform movement of the shelf 1.

FIG. 5 shows a sectional view according to line V—V in FIG. 2, but the transmission gears 15 of FIG. 2 have been left out. The individual parts have already been described above using FIGS. 2 and 3, so that a detailed description is not needed. As can be clearly seen, there is no clearance between the shelves 1, hence a high degree of packing density is possible.

FIGS. 2, 3b and 4 show details of the reverse path of the conveyor chain 10 from the bottom strand 40 to the top strand 41; a guide sprocket wheel 42 is also present at top and bottom, and it can basically have the same design as the guide sprocket wheels 12 according to FIGS. 2 and 3a. Each of the two guide sprocket wheels 42 has an associated parallel guide wheel 43, which can also have the same design as the parallel guide wheel 16, but it must always have the same diameter as the guide sprocket wheel 42. A drive arrangement according to FIG. 3b is provided here too, so that synchronism will prevail between the guide sprocket wheel 42 and the parallel guide wheel 43.

In the case of this deflection point, however, the shelf 1 is conveyed not only with the conveyance means of a pin 11 on the conveyor chain 10, but also with a pin 44, which is likewise mounted on an extended chain stud of a parallel guide chain 45. The upper re-routing of the deflection path is clearly shown in FIG. 4, which also shows that the conveyor chain and the parallel guide chain 45 can have the same design.

The arrangement of the deflection of the conveyor chain 10 for shelves 1 insures that the highest degree of packing density can be obtained in a given space.

Figure 6:
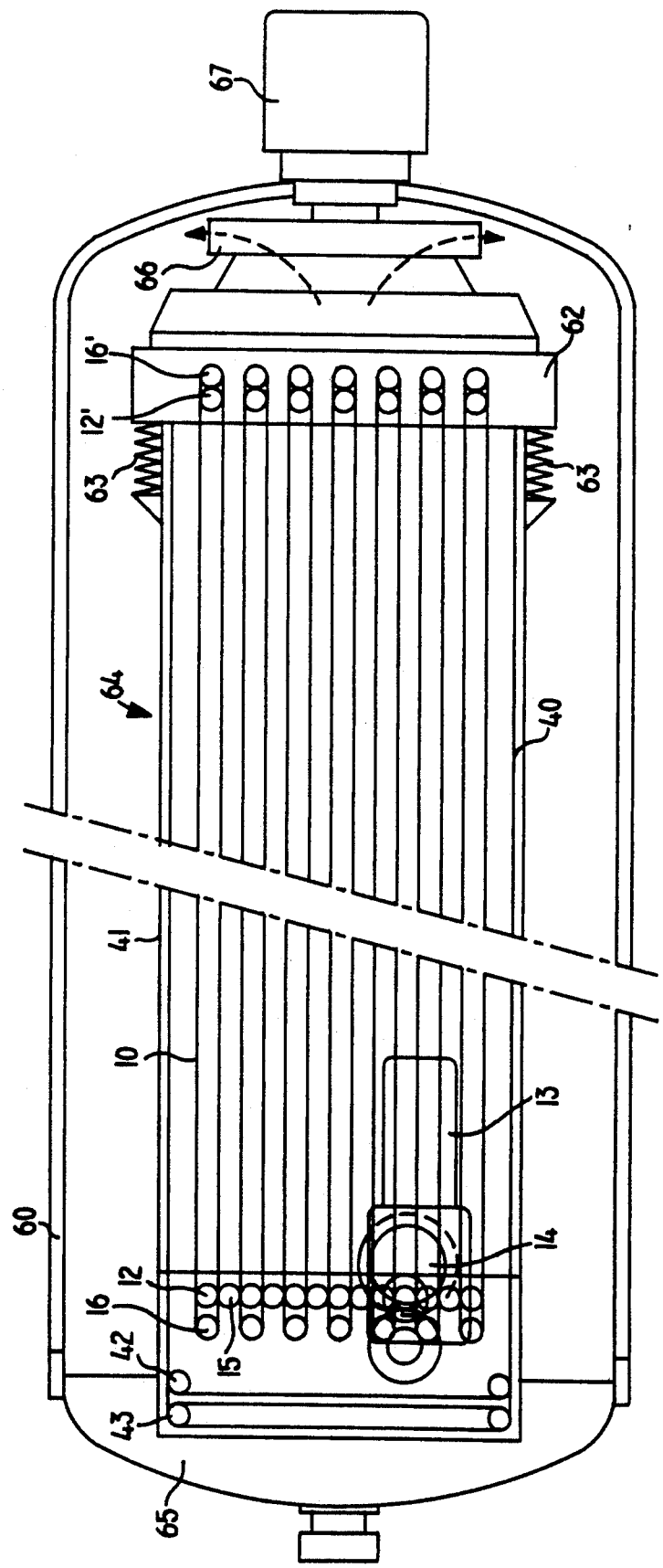
FIG. 6 is a sectional view in a sharply reduced scale of an autoclave equipped with the storage and conveyance unit according to FIGS. 1 to 5.

This makes such a storage arrangement eminently suitable for use in a closed container. FIG. 6 shows an example embodiment for a horizontal autoclave designed as a cylindrical tank 60.

This tank 60 contains an arrangement such as the one described above using FIGS. 1 to 5, which has a conveyor chain 10 forming a storage arrangement leading back and forth by means of a number of guide sprocket wheels 12 and parallel guide wheels 16 on both sides of a translational section 61. Located on the left is a deflection path as in the description according to FIGS. 2 and 4. Arranged in a frame 62 on the right in FIG. 6 are the guide sprocket wheels 12' and the parallel guide wheels 16', so that changes in length with changes in temperature can be compensated by means of springs 63. As usual, the autoclave has a charging opening 64 with a hermetically sealing autoclave door 65.

Figure 7:
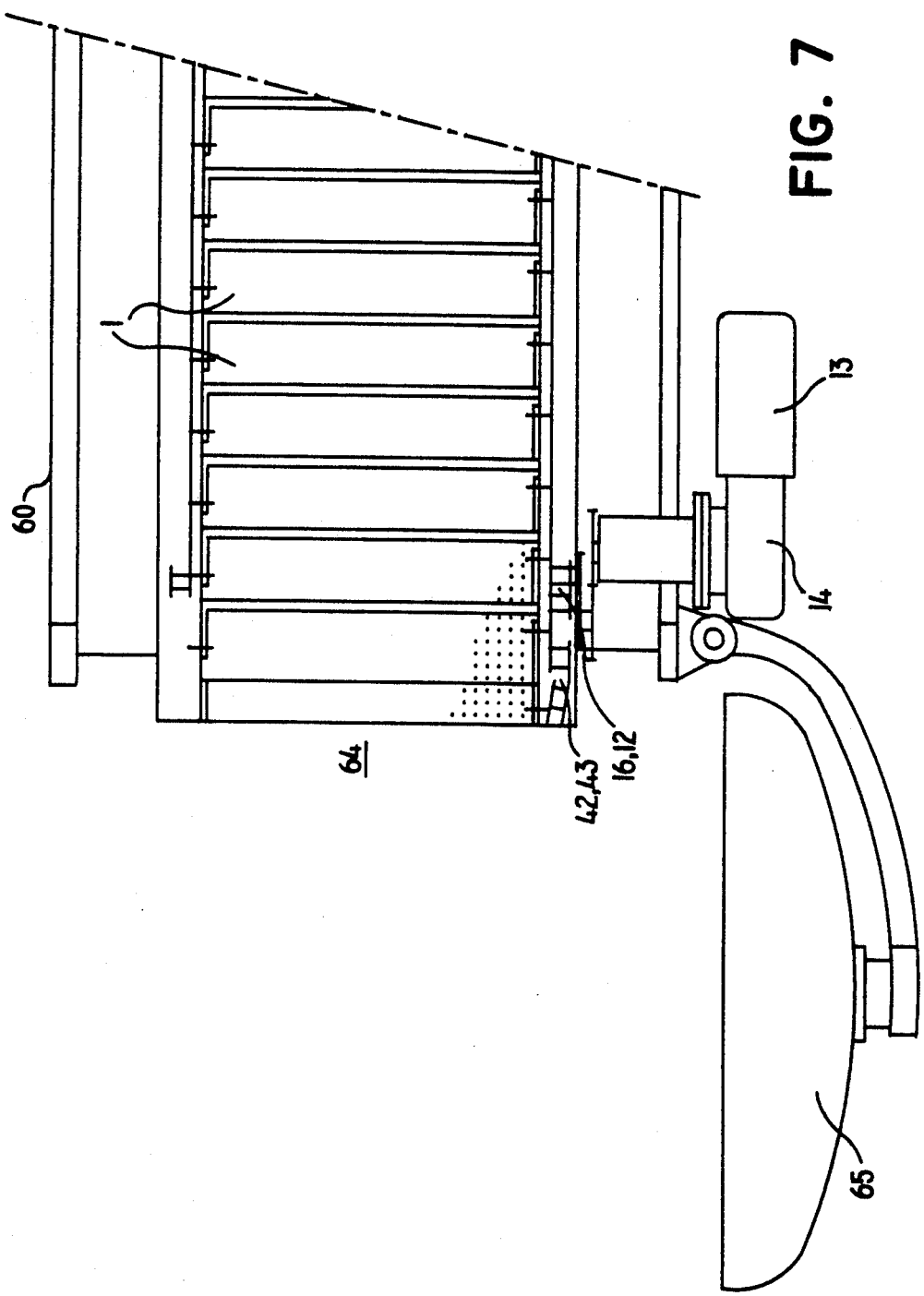
FIG. 7 is a view from the top of the charging side of the autoclave according to FIG. 6 with opened doors.

FIG. 7 shows the upper strand 41 of the storage arrangement with a number of shelves 1 as well as the upper guide sprocket wheels 42 and parallel chain guide wheels 43. This figure also shows the drive 13, 14 for the conveyor chain 10.

Located at the opposite end of the autoclave is a ventilator 66 with its drive motor 67 outside the autoclave 60.

For the operation of the storage arrangement in the autoclave, the conveyor chain 10 is moved in steps in order to unload the shelf 1 at a bottom point and to load it at a point on top. With a storage arrangement about 8 m long in a cylinder having a diameter of about 1.8 m, loading and unloading can be carried out at a rate of about 2,000 units per hour.

As soon as re-charging is done, heating is carried out using steam. The conveyor chain 10 can be running continuously during this time, so that each shelf 1 will be located at least once at each point of the autoclave, hence the heat of the flow of steam is utilized at different points, which provided for uniformly good heating.

Following the prescribed steaming time over a certain length, the steam is shut off and the material is sprinkled or sprayed with water. There is thus no need for a bath and the shelves are hottest at the bottom and return to the coolest point at the top. The advantage of this is that good and rapid cooling can be achieved with little circulating water, something that would not be possible with cooling in a bath.

It is sufficient for the chain to turn about 1½ times, about ¼ hour being needed for cooling.

Figure 8:
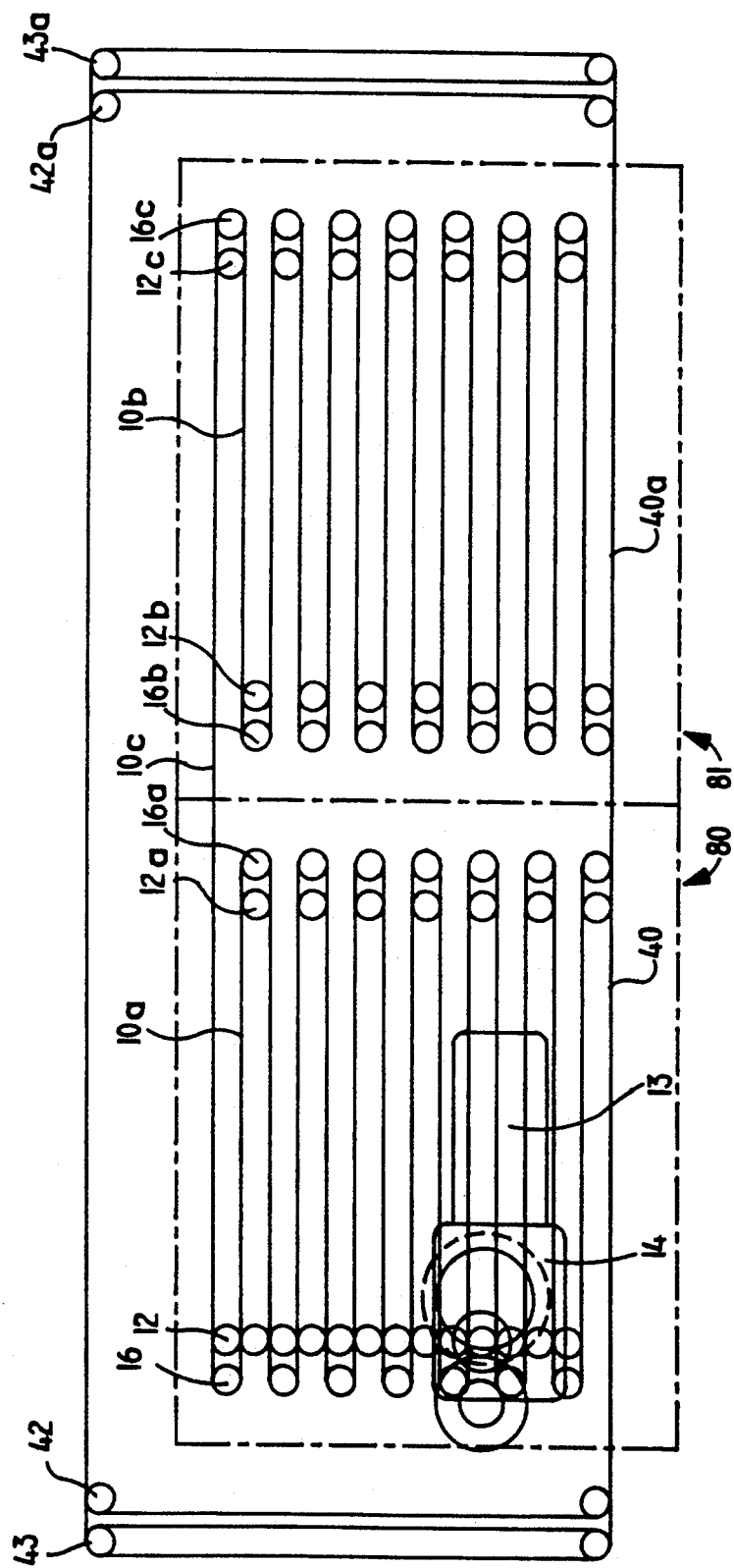
FIG. 8 is a schematic view of a second example embodiment.

The same chain arrangement also provides space-saving advantages for cooling or heating systems, because the cooling or heating arrangement has hitherto had an extended construction with a total length of up to 60 meters. With an arrangement as shown in FIG. 8, this length could be reduced to about a third.

Provision is accordingly made for a chain 10a in a first housing 80 to lead from the bottom upward, the known and above-described parallel diverters for the parallel displacement of the baskets being dealt with on both sides by means of two deflection rollers 12, 16 and 12a, 16a. Also provided for the drive are a motor 13 and a gear 14. Charging is carried out at the left in FIG. 8.

The chain 10a is then transferred from the top diverter roller pair into a second housing 81, where the baskets are then moved downward by steps, also with diverter roller pairs 12b and 16b as well as 12c and 16c. At the bottom, they are then moved to the outside with the chain section 41a to the right in FIG. 8, and are moved in the air above, for example, over the two housings 80, 81 back to the start in front of the housing 80.

Depending on what is required, heating or cooling of the material could thus be carried out in the housing 80, heating or cooling to ambient temperature being then carried out in the housing 81. The material can dry on the way outside the housings 80, 81.

I claim:

1. Means for storing and conveying objects by means of a continuous conveyor chain conducted in a number of parallel planes on which adjacent supporting means such as shelves, baskets or open pans as support for the objects are located and which are fastened to pivot on both sides at their one end on a conveyor chain, with means for parallel guidance of the supporting means in their horizontal plane, characterized in that each conveyor chain for each of the supporting means to be conveyed has at least one pine, these pins being designed to engage first bearing holes on the conveying means, in that parallel guide wheels with pins engaging second bearing holes on the conveying means are also located in the deflection points from one conveyor plane (t−2n+1) to the adjacent conveyor plane (t−2n) in addition to the guide sprocket wheels, and in that the axes of rotation of the guide sprocket wheels and the associated parallel guide wheels form an acute angle opening outward.

2. Means as described in claim 1, characterized in that the parallel guide wheels and the guide sprocket wheels are provided on their side facing away from the conveyor route for the supporting means with auxiliary sprocket wheels over which a swivel chain is laid for synchronous drive of the parallel guide wheels and the guide sprocket wheels.

3. Means as described in claim 1 or 2, characterized in that the division for the distances between the pins on the conveyor chains and the distances between the guide pins on the circumference of the parallel guide wheels are the same or an even multiple thereof.

4. Means as described in claim 3, characterized in that the drive sprocket wheels at the two deflection points are coupled at one side through idler gears and only one sprocket wheel is driven by a drive motor.

* * * * *